United States Patent [19]

Smith et al.

[11] Patent Number: 5,680,142
[45] Date of Patent: Oct. 21, 1997

[54] COMMUNICATION SYSTEM AND METHOD UTILIZING AN ANTENNA HAVING ADAPTIVE CHARACTERISTICS

[76] Inventors: David Anthony Smith, 99 Applegarth Avenue, GU26LT Guildford, Great Britain; Lennart Hans Rinnbäck, Kullevägen 16B, 175 40, Järfälla, Sweden

[21] Appl. No.: 554,524

[22] Filed: Nov. 7, 1995

[51] Int. Cl.⁶ .................................................. H01Q 3/22
[52] U.S. Cl. ........................... 342/372; 342/375; 455/65
[58] Field of Search ................................. 342/372, 375; 455/65

[56] References Cited

U.S. PATENT DOCUMENTS

| 3,174,150 | 3/1965 | Sferrazza et al. . | |
|---|---|---|---|
| 3,781,890 | 12/1973 | Boyer . | |
| 3,885,237 | 5/1975 | Kirkpatrick . | |
| 4,249,181 | 2/1981 | Lee . | |
| 4,310,722 | 1/1982 | Schaible | 179/2 EB |
| 4,672,638 | 6/1987 | Taguchi et al. | 375/99 |
| 5,008,680 | 4/1991 | Willey et al. . | |
| 5,084,707 | 1/1992 | Reits . | |
| 5,138,327 | 8/1992 | Chang et al. . | |
| 5,151,704 | 9/1992 | Gunmar et al. . | |
| 5,151,706 | 9/1992 | Roederer et al. . | |
| 5,274,844 | 12/1993 | Harrison et al. . | |
| 5,276,907 | 1/1994 | Meidan . | |
| 5,303,240 | 4/1994 | Borras et al. . | |
| 5,408,679 | 4/1995 | Masuda . | |
| 5,412,620 | 5/1995 | Cafarella et al. | 367/134 |
| 5,448,753 | 9/1995 | Ahl et al. . | |
| 5,534,876 | 7/1996 | Erickson et al. | 342/387 |
| 5,596,330 | 1/1997 | Yokev et al. | 342/387 |

FOREIGN PATENT DOCUMENTS 63-274231  1/1987  Japan .

OTHER PUBLICATIONS

Kristine Bell, John Capetanakis, and Jeffrey Bugler, *Adaptive Nulling for Multiple Desired Signals Based on Signal Waveform Estimation;* Communications—Fusing Command, Control and Intelligence: Proceedings of the Military Communications Conference, San Diego, Oct. 11–14, 1992, vol. 3, 14 Oct. 1992, Institute of Electrical and Electronics Engineers, pp. 919–923.

S. Sivanand, *On Adaptive Arrays in Mobile Communication,* IEEE Conference Proceedings: National Telesystems Conference 1993; Jun. 16–17, 1993, Atlanta, Georgia, 16 Jun. 1993, Institute of Electrical and Electronics Engineers, pp. 55–58.

*Primary Examiner*—Thomas H. Tarcza
*Assistant Examiner*—Dao L. Phan

[57] ABSTRACT

An apparatus, and an associated method, for facilitating reception and transmission of signals in a communication system, such as a cellular communication system. An antenna having an antenna pattern adaptively responsive to propagation characteristics extending between communication stations of the communication system. The antenna pattern of the antenna is selected responsive to the propagation characteristics. When the propagation characteristics are indicative of a channel exhibiting only insignificant multipath components, the antenna pattern is selected to be highly directional, and when the propagation characteristics are indicative of a channel exhibiting significant multipath components, the antenna pattern is altered to become less directional.

23 Claims, 5 Drawing Sheets

COMMUNICATION SYSTEM AND METHOD UTILIZING AN ANTENNA HAVING ADAPTIVE CHARACTERISTICS

The present invention relates generally to a radio communication system, such as a cellular communication system. More particularly, the present invention relates to an apparatus, and an associated method, for facilitating the transmission and reception of signals transmitted in the communication system through the use of an antenna having adaptive lobe characteristics. The antenna lobe characteristics are adaptive, responsive, at least in part, to the propagation characteristics of the radio communication channels upon which the radio communication signals are transmitted during operation of the communication system.

BACKGROUND OF THE INVENTION

A communication system is formed, at a minimum, of a transmitter and a receiver connected by way of a communication channel. Information-containing, communication signals generated by the transmitter are transmitted upon the communication channel to be received by the receiver. The receiver recovers the informational content of the communication signal.

A wireless, or radio, communication system is a type of communication system in which the communication channel is a radio frequency channel defined upon the electromagnetic frequency spectrum. A cellular communication system is exemplary of a wireless communication system. The communication signal transmitted upon the radio frequency channel is formed by combining, i.e., modulating, a carrier wave together with the information which is to be transmitted. The receiver recovers the information by performing a reverse process, i.e., demodulating, the communication signal to recover the information. While, for purposes of explanation, the following description describes the operation of the receiver to receive communication signals, more precisely, the receiver is operative to recover the informational content of the information contained in the signal transmitted by the transmitter.

The communication signal transmitted by the transmitter to the receiver, when received by the receiver, must be of at least a minimum energy level and signal quality level to permit the receiver to recreate the transmitted signal.

The signal transmitted to the receiver is susceptible to scattering, diffraction, reflection, and attenuation when transmitted upon the transmission channel. Signal reflection of the transmitted signal causes the signal actually received by the receiver to be the summation of signal components transmitted by the transmitter by way of, in some instances, many different paths, in addition to a direct, line-of-sight path. Sometimes, the direct, line-of-sight path is blocked, and the signal actually received by the receiver is formed of only reflected signal components.

Because the signal actually received by the receiver can be the summation of signal components transmitted upon a plurality of paths, the communication channel is sometimes called a multipath channel, and the signal actually received by the receiver is sometimes referred to as a multipath signal. That is to say, the communication channel is sometimes a plurality of signal paths extending between the transmitter and receiver.

The energy levels of the signal components of the multipath signal depend upon the paths upon which the components are transmitted. The power, a value related to the energy level, of a signal component, of a direct, line-of-sight signal component is defined by the Maxwell field equation. The power of a reflected signal component is defined by the radar equation. Therefore, while the power of a direct, line-of-sight signal component, or a diffracted signal component, reduces as a squared, or higher, function of the distance from the transmitter, the power of a reflected signal component reduces as a fourth, or higher, level function of the distance from the transmitter.

As a result, when the distance separating the transmitter and receiver increases, reflected signal components which are significantly longer than a direct (or nearly direct), line-of-sight signal component typically become progressively weaker than the direct, line-of-sight signal component. When the distance separating the transmitter and receiver is large, the reflected signal components form only a negligible amount of the power of the signal received by the receiver, and the transmitter can be considered to be a "point source."

A non-directional (or "omnidirectional") antenna is typically best able to recover the information contained in the signal transmitted by the transmitter when reflected signal components (also called "multipath" components) form significant portions of the signal received by the receiver. Conversely, a directional antenna can be used when signals received at a receiver do not include significant levels of multipath signal components.

As mentioned previously, a cellular communication system is a wireless communication system. A cellular communication system includes a plurality of spaced-apart, fixed-site transceivers, referred to as base stations, positioned throughout a geographic area. Each of the base stations supplies a portion, referred to as a cell, of the geographic area. A moveably positionable, or otherwise mobile, transceiver, referred to as a mobile unit, can be positioned at any location (i.e., within any cell) within the geographic area encompassed by the cellular communication system. The mobile unit, when so-positioned, can transmit communication signals to at least one of the base stations.

As the mobile unit moves between cells, the mobile unit is "handed-off" from one base station to another base station. That is to say, when a mobile unit in communication with a first base station travels out of the cell defined by the first base station and into the cell defined by a second base station, the mobile unit commences communication with the second base station. The hand-off from the first base station to the second base station occurs automatically and without apparent interruption in communication by one communicating by way of the cellular communication system.

Typically, the base stations of the cellular communication system each include an antenna device for transmitting signals to, and receiving signals from, mobile stations located anywhere with the cell. The signal actually received by the base station is sometimes a complex interference pattern formed of various reflections of the transmitted signal transmitted from the mobile by way of many various paths of a multipath channel. That is to say, the source of the transmitted signal, i.e., the mobile unit, in such instances, appears to the base station to be a "wide" signal source rather than a "point" source.

For reasons described above, as the distance separating the mobile unit and a base station increases, the power of the multipath components tend to become progressively weaker relative to a signal transmitted upon a direct path from the mobile unit to the base station. In such instances, the mobile unit appears to the base station to be a relatively "narrow"

signal source. And, as the distance separating the mobile unit and the base station increases further, the mobile unit tend to appear to the base station to be more of a "point" source.

A base station having a directional antenna in which the geometry of an antenna pattern formed by the directional antenna includes an elongated primary lobe would permit better reception of signals transmitted by such a remotely-located mobile unit. However, when the mobile unit is positioned in proximity to the base station, a base station having a non-directional antenna in which the geometry of the antenna pattern includes a broader primary lobe is typically better able to receive a signal generated by the mobile unit as a multipath signal component of the signal oftentimes form significant portions of the received signal.

While some existing base stations include directional antennas, the directional antennas are of fixed characteristics. That is to say, the antenna beam configurations are of nominally fixed beam shapes.

While steerable, or otherwise adaptable, antenna devices are known, such antenna devices have been generally utilized in radar and astronomical applications.

In radar applications, a signal pulse (the "transmitted pulse") is typically transmitted at a known location at a known time and in a known direction. The radar system detects the signal pulse once reflected (the "reflected pulse") from a target. The target is typically located at a significant distance from the location at which the transmitted pulse is transmitted, and the target can be considered to be a point source. Information related to the origin, time of signal transmission of the transmitted pulse, and direction of transmission of the transmitted pulse is utilized in processing the reflected pulse. Doppler shift speed indications, for example, of the target can be determined in such manner. As the target forms a point source, a directional antenna having an extremely elongated primary lobe is typically utilized to most accurately determine the position of the target.

In astronomical applications, directional antennas are also typically utilized. The directional antennas are utilized to detect signals generated by distant signal sources which can also be considered to be point sources.

In both of these applications in which adaptive, directional antennas have been utilized, multipath signal components are unwanted as such components could cause the generation of a false target in the radar application. The objective is to maximize the resolution with which the location of the distant signal can be determined.

Steerable antenna systems have also been proposed for cellular applications, where the antenna gain of an elongated antenna lobe can assist in providing acceptable signal strength towards distant mobiles, while rejecting interference with other mobiles using the same frequency in another cell (which will typically be located in different directions as seen from the base station). This uses a beam with effectively constant lobe characteristics, other than the ability to point this lobe in different directions by mechanical, electronic or other means. The state of the art is to adaptively sum the components at each of a plurality of elements of a phased antenna array, after transforming said components with a phase and/or amplitude modulation, such that arbitrarily lobe characteristics are adaptively formed in which the antenna system overall has zero gain towards one or more specific, off-axis, interference sources. This technique is sometimes known as "adaptive nulling". That is to say the lobe characteristics are formed to reject a plurality of other signal sources.

As utilization of cellular communication networks, as well as other types of wireless communication systems, become increasingly popular, increased usage of the systems necessitates that the radio frequency channels allocated for such communication be efficiently utilized. In the example of a cellular communication system, a base station of a cellular communication system having an antenna exhibiting characteristics dependent upon the propagation characteristics of the communication signals transmitted between the mobile unit and the base station would facilitate efficient utilization of the allocated frequency channels. Other types of wireless communication systems would similarly benefit from the utilization of such an antenna.

It is in light of this background information related to wireless communication systems, such as a cellular communication system, that the significant improvements of the present invention have evolved.

SUMMARY OF THE INVENTION

The present invention advantageously provides apparatus and an associated method for facilitating communication in a wireless communication system, such as a cellular communication system. A directional antenna having adaptive lobe characteristics is utilized. Because the characteristics of the antenna are adaptive, the antenna characteristics can be selected in a manner to best transmit and receive information transmitted during operation of the communication system.

In accordance with one aspect of the present invention, an apparatus, and an associated method, for a communication system having a first communication station and at least a second communication station is disclosed. Apparatus is coupled to the first transceiver for facilitating transmission of communication signals upon a radio communication channel between the first and second communication stations. A propagation characteristic determiner determines propagation characteristics of the radio communication channel upon which the communication signals are transmitted between the communication stations. An antenna has an antenna characteristic adaptively responsive to the propagation characteristics determined by the propagation characteristic determiner.

In another aspect of the present invention, a radio base station transmits downlink signals to, and receives uplink signals from, at least one mobile unit. Transceiver circuitry generates the downlink signals and processes the uplink signals, once received. A distance determiner is operative responsive to selected uplink signals processed by the transceiver circuitry. The distance determiner determines a distance value representative of the distance separating the mobile unit and the transceiver circuitry. An antenna is coupled to the transceiver circuitry. The antenna has an antenna characteristic adaptively responsive to the distance value determined by the distance determiner.

When, for instance, the distance separating the mobile unit and the transceiver circuitry is determined to be a significant distance, a lobe of an antenna pattern of the antenna is elongated, both to isolate the uplink signal and to reject off-axis noise and interfering signals. When the distance separating the mobile unit and the base station is determined to be a relatively small distance, the lobe of the antenna pattern antenna beam configuration is selected to be less-elongated and the antenna approaches the characteristics of a non-directional antenna. The antenna is better able thereby to capture off-axis signals transmitted upon multiple signal paths formed between the mobile unit and the base station.

More generally, because the antenna characteristics of the antenna are adaptively responsive to the propagation characteristics of the communication channel extending between first and second communication stations, as the propagation characteristics of the communication channel changes, the antenna characteristic of the antenna is adaptively altered in a manner best to ensure adequate reception of signals transmitted between the transceivers. When the propagation characteristics of the communication channel indicates that significant amounts of multipath occurs, the antenna characteristic of the antenna is selected to facilitate reception of the majority of signal energy transmitted upon such a channel. When, conversely, the propagation characteristics of the communication channel indicates that lesser amounts of scattering occur, the antenna characteristic of the antenna is selected to reject off-axis signals and to isolate the direct path signal transmitted upon the communication channel.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
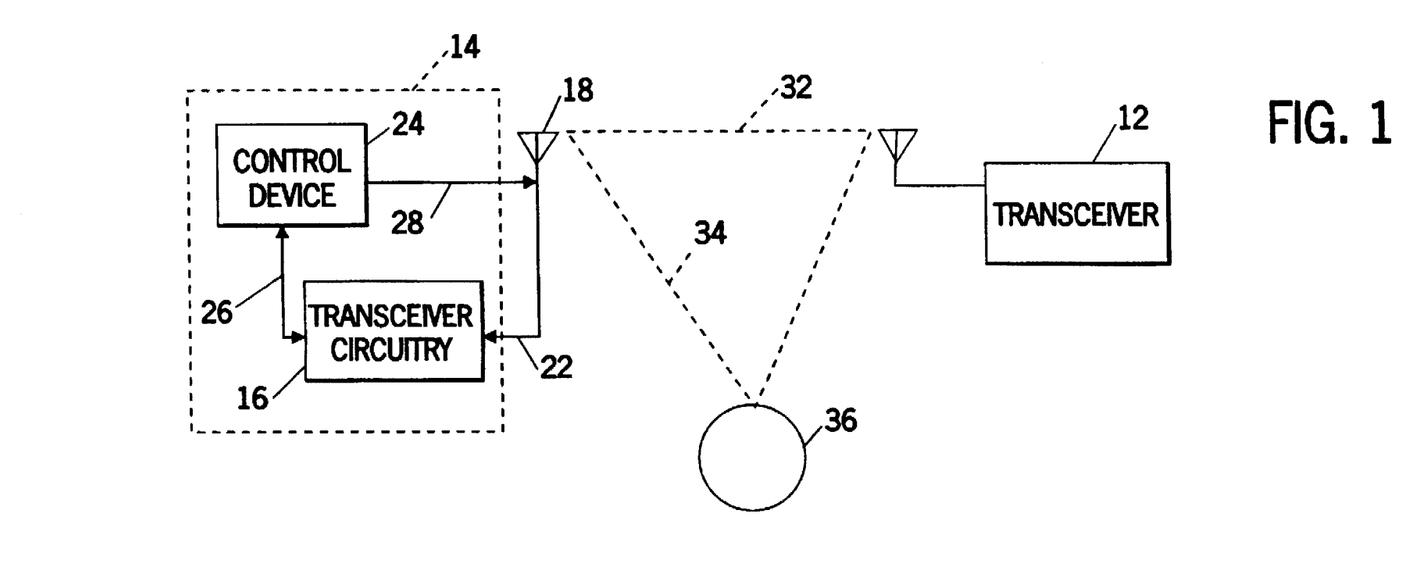
FIG. 1 is a functional block diagram of a communication system which incorporates an embodiment of the present invention therein.

Referring first to FIG. 1, a communication system, shown generally at 10, which includes an embodiment of the present invention is shown. The communication system 10 is a wireless, or radio, communication system and permits communication between a transmitting location, here a movably-positionable, remotely-positioned transceiver 12 and a receiver, here a fixed-location transceiver 14. While the illustrated embodiment includes two transceivers 12 and 14, in other embodiments, the transmitting station is formed of only a transmitter and the receiving station is formed of only a receiver.

Communication signals generated by a transmitter portion of the transceiver 12 are transmitted upon one or more radio frequency communication channels. The fixed location transceiver 14 includes transceiver circuitry 16 having a transmitter portion and a receiver portion. The receiver portion of the transceiver circuitry 16 is tuned to the radio frequency channel or channels upon which the communication signals generated by the transceiver 12 are transmitted.

The communication signals generated by the transceiver 12 form radio-frequency electromagnetic signals which can be transmitted upon a radio frequency channel.

The communication signals transmitted upon the radio frequency channel by the transceiver 12 are detected by an antenna device 18 coupled to the fixed-location transceiver 14. The antenna device 18 converts the radio frequency, electromagnetic signals into electrical signals which are generated on line 22 and supplied to the receiver portion of the transceiver circuitry 16.

A control device 24 is coupled to the transceiver circuitry 16 by way of the line 26 and to the antenna device 18 by way of the line 28. In the illustrated embodiment, the control device 24 is operative not only to control operation of the transceiver circuitry 16, but is further operative to form a propagation characteristic determining device for determining the propagation characteristics of the communication channel extending between the transceivers 12 and 14. Responsive to the propagation characteristics of the communication channel determined by the propagation characteristic determining device formed of the control device 24, the control device is further operative to select the lobe geometry of the antenna pattern of the antenna device 18.

In one embodiment of the present invention, when the distance separating the transceivers 12 and 14 is relatively small, the primary lobe of the antenna pattern is selected to approach, or become, non-directional. As the distance separating the transceivers 12 and 14 increases, the primary lobe is selected to be increasing elongated in geometric configuration.

The control device 24 is able to cause adaptive alteration of the lobe geometry of the antenna pattern of the antenna device 18. Thereby, as the communication channel characteristics vary between the transceivers, the antenna beam configuration of the antenna device can be altered to provide best for communication between the transceivers 12 and 14.

The communication system 10 is exemplary of various different types of wireless communication systems in which a transmitting station transmits communication signals to a receiving station. The communication system 10, for instance, is exemplary of a cellular communication system in which the transceiver 12 forms a mobile unit and the transceiver 14 forms a radio base station coupled to a public service telephone network (PSTN) in conventional fashion.

In many areas in which a cellular communication system is installed, signals transmitted between a mobile unit and a radio base station upon one or more radio frequency channels are subjected to significant levels of multipath distortion. As mentioned above, a communication signal transmitted, for example, by the mobile unit to the radio base station, when received by the base station, is actually a complex interference pattern made up of a composite of multiple signal portions transmitted to the base station by way of multiple paths. In the illustration of FIG. 1, in addition to a signal component transmitted upon a direct, line-of-sight path 32, signal components are transmitted upon reflected paths, such as path 34 in which a signal component of the transmitted signal is reflected off of an object 36. The path 34 defines an incident path portion and a reflected path portion. The path 34 is merely exemplary. A communication channel exhibiting significant numbers of multipath components includes many paths analogous to the illustrated path.

In some instances, no direct, line-of-sight path exists between the mobile unit and the radio base station. When significant levels of multiple path distortion are present, the transmitting signal source, such as the mobile unit, does not appear to be a point source. Rather, the mobile unit appears to the base station to be "wider" than a point source. In some instances, the mobile unit may appear to the base station to be tens of degrees wide. In such instances, the lobe geometry of the antenna pattern of the antenna, here antenna device 18 of the transceiver 14, is selected to be less-directional in configuration in order to recover the majority of the signal energy.

A line-of-sight radio signal, such as the signal component transmitted upon the path 32, is defined by the Maxwell field equation. Therefore, the field strength of the signal decreases as a first power of distance and power level decreases as a squared function of distance in free space. A diffracted signal exhibits similar characteristics, but the field strength of a diffracted signal is further reduced as the energy passing through a gap "spreads out faster", and the gap can be considered to define a new source of energy.

Conversely, a multipath, or reflected, signal is defined by a radar equation as the multipath is a product of two or more path segments. With respect to the exemplary path 34 shown in FIG. 1, the path is formed of both an incident path portion and a reflected path portion. Each of the path portions affects the signal power of a signal component transmitted upon the multipath channel as a second function, multiplied by the reflective properties of the surface from which the signal component is reflected. The power of the reflected signal component falls with a fourth, or higher, power of distance, as governed by the radar equation.

Therefore, power levels of a direct, line-of-sight signal and a multipath signal fall as functions of distance at different rates, as the distance between the mobile unit and base station increases. And, the reflected signals become progressively weaker and less significant relative to a line-of-sight signal component. Also, the apparent size of the mobile unit appears to the base station to decrease as the distance separating the mobile unit and the base station increases.

Figure 2A:
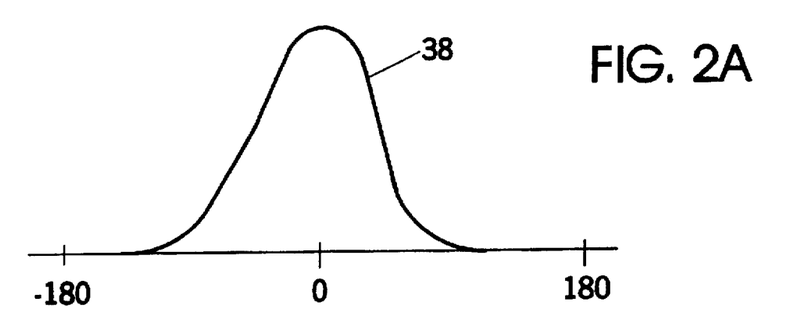
FIGS. 2A, 2B, and 2C are graphical representations illustrating various antenna beam configurations which an adaptive antenna forming a portion of an embodiment of the present invention may form.
Figure 2B:
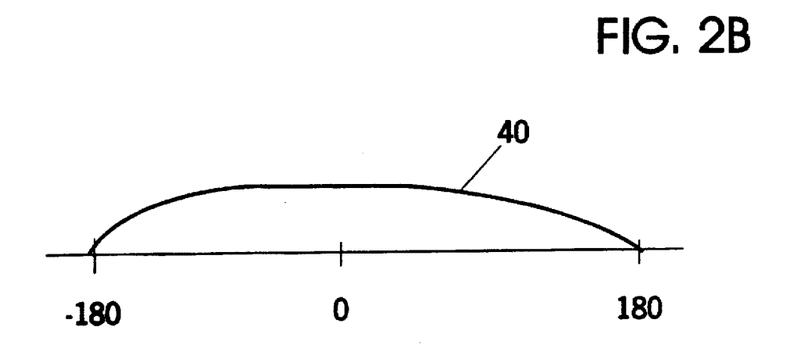
Figure 2C:
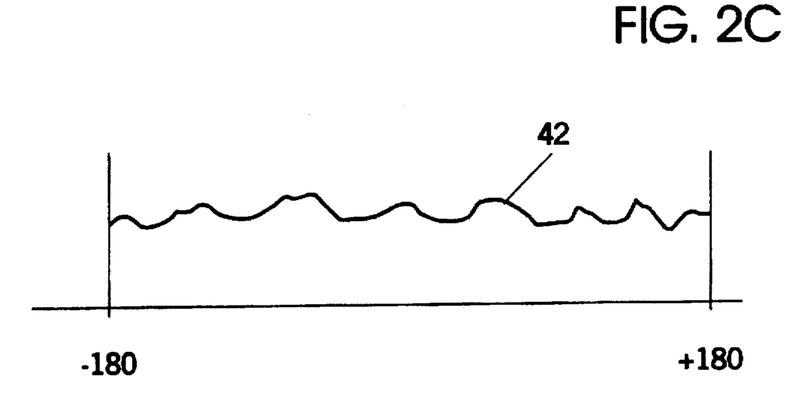

FIGS. 2A, 2B, and 2C illustrate the angular distribution of energy from signals transmitted upon a communication channel by a transmitter, such as the transceiver 12 shown in FIG. 1 and received by a receiver, such as the transceiver 14 shown in FIG. 1.

The angular distribution 38 shown in FIG. 2A is representative of the energy spectrum of a signal transmitted upon a communication channel exhibiting only relatively small amounts of multipath scattering. Most of the energy of the signal is contained in a narrow angular area. A point source of energy exhibits an energy spectrum similar to the distribution 38. A distantly-positioned signal source therefore exhibits such a similar distribution.

The angular distributions 40 and 42 shown in FIGS. 2B and 2C are representative of energy spectrums of signals transmitted upon communication channels exhibiting significant amounts of multipath scattering. The energy of the signals are contained in broader angular areas. A closely-positioned signal source therefore exhibits similar such distributions.

A signal transmitted by a radio base station to a mobile unit on a multipath channel exhibits analogous characteristics. That is to say, as the distance separating the mobile unit and the base station increases, multipath signal components of a signal transmitted by the base station to the mobile unit typically become increasingly insignificant relative to a direct, line-of-sight signal component.

A base station antenna device, such as the antenna device 18 shown in FIG. 1, is best able to detect signals transmitted over a channel with narrow angular distribution, and is best able to transmit signals to the mobile unit when the lobe geometry of the antenna pattern of the antenna device is highly-directional and includes an elongated primary lobe extending in the direction of the distantly-positioned mobile unit. Conversely, when the angular distribution of energy is broad, multipath signal components of signals transmitted between the base station and the mobile unit form significant portions of the transmitted signal. The antenna beam configuration of the base station antenna device, such as the antenna device 18, is best able to detect signals transmitted by the closely-positioned mobile unit, and is best able to transmit signals to the closely-positioned mobile unit, when the lobe geometry of the antenna pattern of the antenna device is more non-directional, i.e., when the primary lobe is less-elongated in configuration.

As the preceding description indicates, the antenna beam configuration of the antenna device 18 best able to facilitate communication between the transceivers 12 and 14 depends upon the propagation characteristics of the communication channel extending between the transceivers. When the propagation characteristics of the communication channel are such that multipath components form significant portions of the signals transmitted between the transceivers, an antenna pattern having a non-directional, i.e., non-elongated primary lobe is best able to facilitate communication between the transceivers. When, conversely, the propagation characteristics of the communication channel are such that multipath components form relatively insignificant portions of the signals transmitted between the transceivers, an antenna pattern having a directional, i.e., elongated primary lobe is best able to facilitate communication between the transceivers.

Because of the correlation between distance of the falloff of power levels of direct-path vs. non-direct path signal components, one embodiment of the present invention utilizes determinations of distances separating the transceivers to determine the propagation characteristics of the communication channel. In another embodiment of the present invention, the angular energy spreading of signals received at the transceivers is utilized to determine the propagation characteristics of the communication channel. And, in other embodiments, signal strength or signal quality indications are used to determine the propagation characteristics of the communication channel.

Figure 3:
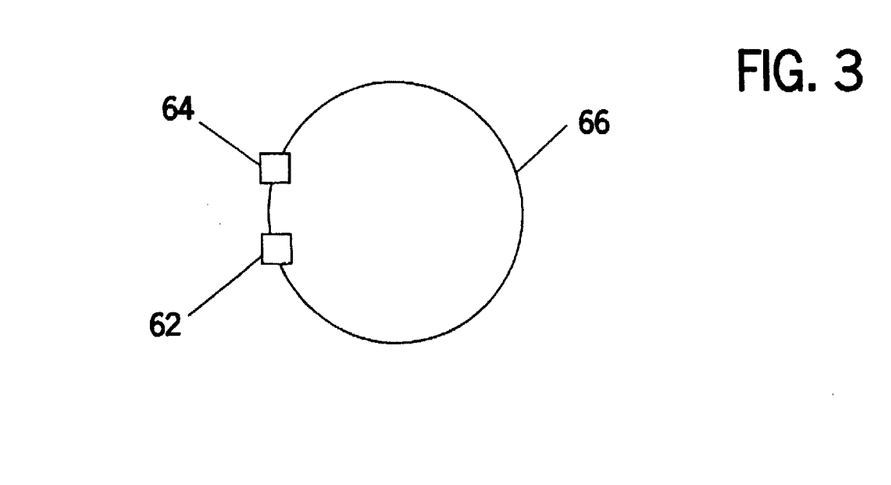
FIG. 3 is a partial functional block, partial schematic view of an antenna array which forms a portion of an embodiment of the present invention.

FIG. 3 illustrates an embodiment in which the antenna device 18 forms a phased array and is formed of two antenna elements 62 and 64. The phased-array formed of the antenna elements 62 and 64 define an antenna pattern 66. The antenna elements 62 and 64 form radiating elements and uplink receivers and they together form either a switched beam or a steerable beam antenna, in conventional manner. In a switched beam configuration, the antenna pattern is selected by, e.g., physically delaying, such as by altering the physical path lengths of the feeds towards antenna elements 62 and 64.

Figure 4:
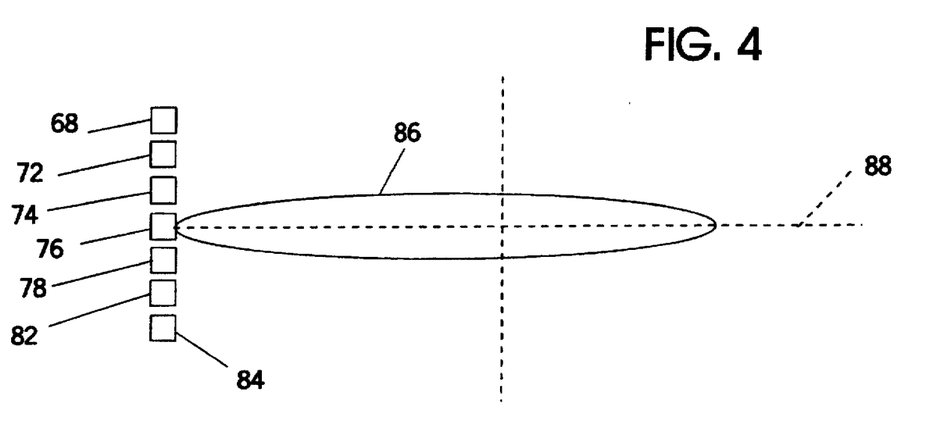
FIG. 4 is a partial functional block, partial schematic view, similar to that shown in FIG. 3, but of an antenna array formed of an increased number of antenna elements.

FIG. 4 illustrates an antenna array of an antenna device forming a portion of another embodiment of the present invention. In this embodiment, an antenna array is formed of seven antenna elements 68, 72, 74, 76, 78, 82 and 84. The antenna array formed of the antenna elements 68–84 together synthesize a directional antenna pattern 86 which is formed of a primary lobe elongated along a longitudinal axis 88. Here, again, the antenna array may form either a switched beam antenna or a steerable beam antenna. By varying the number of elements in the array can be selected as desired.

For instance, the antenna beam configuration 66 shown in FIG. 3 can be formed by the antenna array illustrated in FIG. 4 when only two of the antenna elements 68–84 are selected to form active elements of the array. That is, the amplitudes of signals applied to the remaining ones of the antenna elements are of zero values. FIGS. 3 and 4 are merely exemplary of many different means by which the lobe geometry may be adaptively varied.

The antenna beam configuration can also be altered by introducing phase shifts into the signal applied to the various antenna elements.

Figure 5:
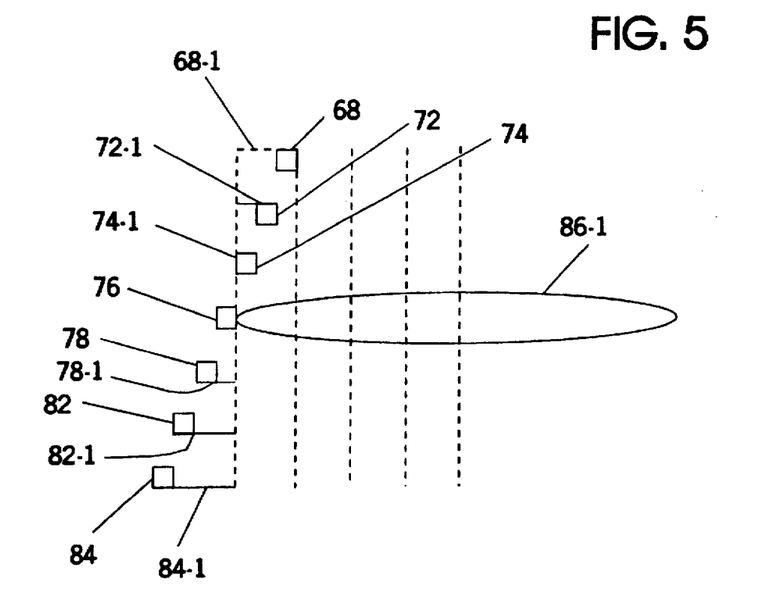
FIG. 5 is a partial functional block, partial schematic view, similar to those shown in FIGS. 3 and 4, but in which signals applied to the antenna element of the antenna array are offset in phase relative to one another to synthesize a planar wave front at an angle to the antenna array.

FIG. 5 illustrates again the antenna array shown in FIG. 4 and formed of antenna elements 68, 72, 74, 76, 78, 82, and 84. Here, the antenna elements are set-offline relative to one another to illustrate phase delays which are introduced to synthesize a planar wavefront at an angle to broadside. The amounts of the phase shifts of the signal applied to the elements 68–84 are indicated by the line segments 68-1, 72-1, 74-1, 76-1, 78-1, 82-1, and 84-1, respectively. As illustrated in the figure, the phase shifts of the signal applied to the top three antenna elements 68–74 are positive while the phase shifts of the bottom three antenna elements 78, 82 and 84 are negative valued. The antenna pattern formed of the array of antenna elements 68–84 again defines an elongated lobe.

Figure 6:
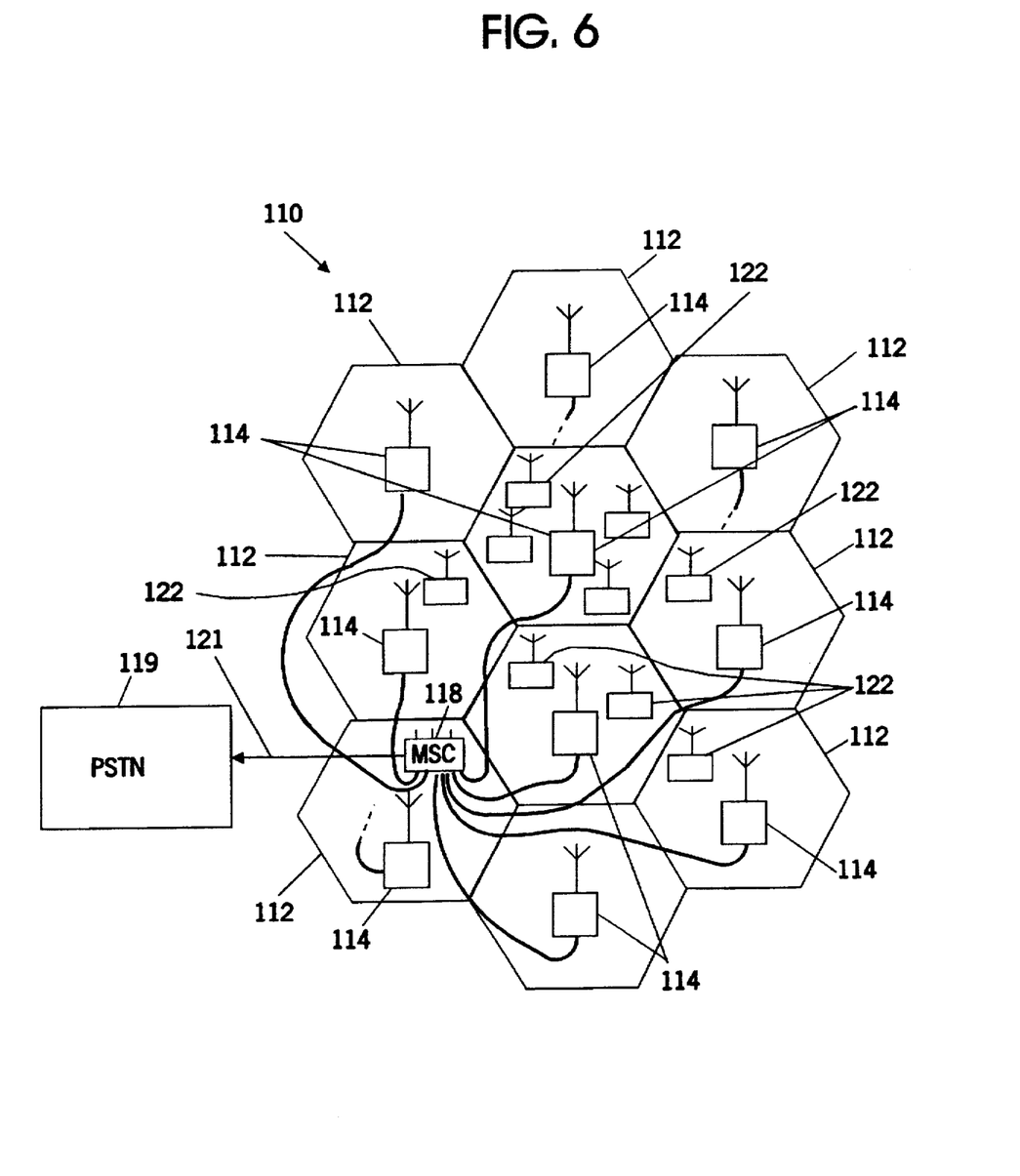
FIG. 6 is a schematic illustration of a cellular communication system.

FIG. 6 illustrates a cellular communication system, shown in generally at 100, in which an embodiment of the present invention may be embodied. The cellular communication system 100 includes a plurality of cells 112 defined about a geographical area. The cells 112 are each defined by a radio base station 114. The radio base stations 114 are, for purposes of illustration, pictured at equally spaced-apart locations throughout the geographic area encompassed by the system 110.

The base stations 114 are each coupled, by way of lines 116, to a mobile switching center (MSC) 118. The MSC 118 is coupled to a public service telephone network (PSTN) 119, here by way of lines 121.

Telephonic communication between a subscriber positioned at a calling station and a selected mobile unit 122 positioned at any location within the geographical area encompassed by the cellular communications system 110 is permitted. A call placed to a selected mobile unit 122 is routed to a base station 114 of the system 110 in conventional manner.

Once the call is routed to an appropriate one of the base stations 114, the base station generates modulated signals which are transmitted to the selected mobile unit 122. When the selected mobile unit 122 responds to the modulated signals transmitted thereto, telephonic communication is effectuated between the calling station and the selected mobile unit.

Figure 7:
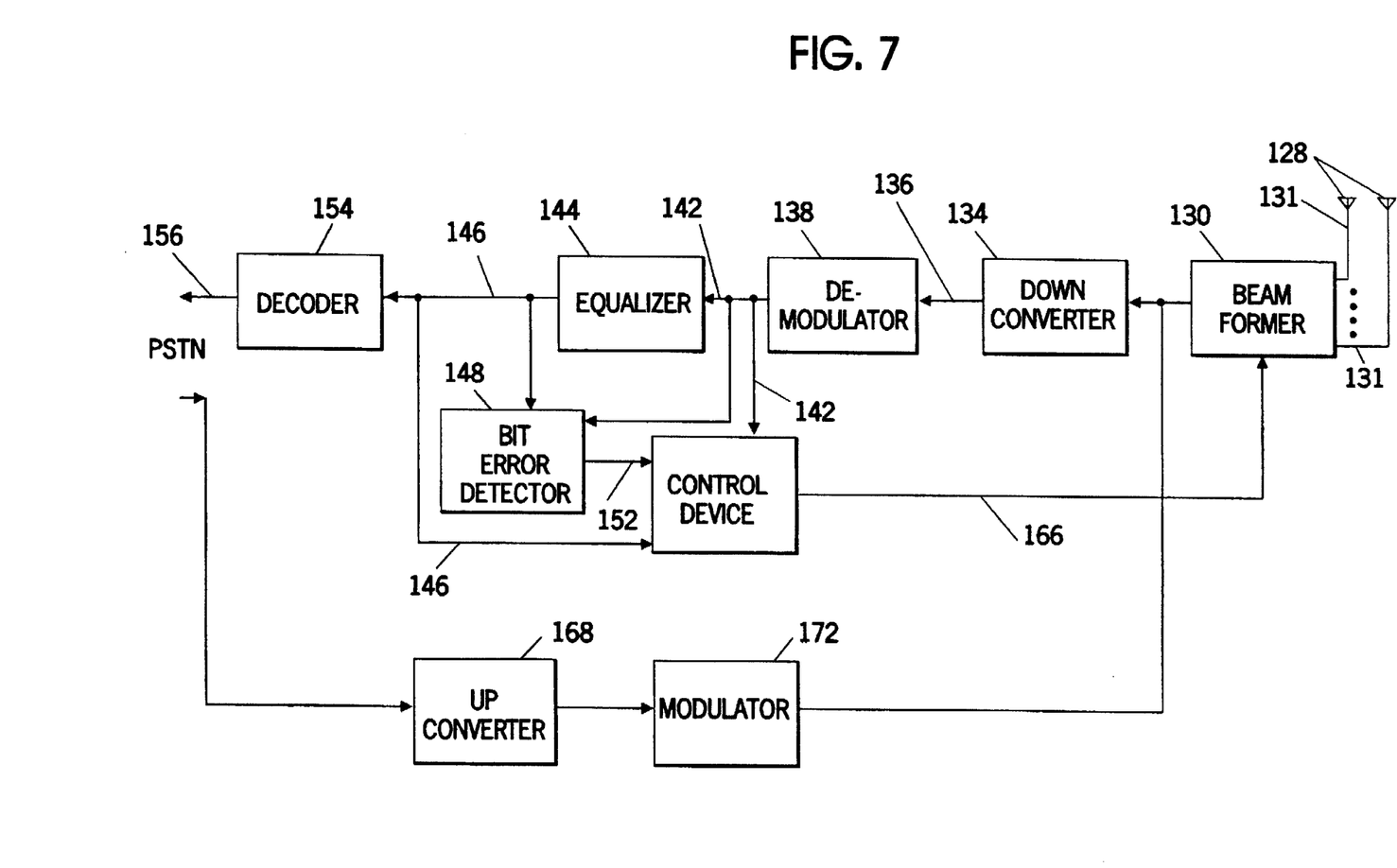
FIG. 7 is a functional block diagram of a radio base station of an embodiment of the present invention which can be utilized to form a portion of the cellular communication system shown in FIG. 7.

FIG. 7 illustrates a radio base station 114 of an embodiment of the present invention. When the base stations 114 are positioned as shown in the exemplary illustration of FIG. 7, the base stations 114 together form and define a cellular communication system.

An array of antenna elements 128 is coupled to the base station 114 via a beam form former 130. The array is operative to receive radio frequency, electromagnetic signals transmitted thereto by a mobile unit upon one or more radio frequency communication channels. The antenna array is formed, e.g., either of a switched beam or steerable beam antenna as described previously with respect to FIGS. 3–4 and 5–6, respectively. The beam former 130 determines the characteristics of the antenna array formed of the antenna elements 128. The beam former 130 may, for example, be formed of a Butler or Blass matrix. Each output of the matrix corresponds to a beam switched in a given beam direction, in convention manner. Signals detected by the antenna elements 128 are converted into electrical form on the lines 131. The lines 13 are coupled to the beam former 130, and the beam former 130 is coupled to a down converter 134.

The down converter 134 down converts the signals supplied thereto in conventional manner to form down-converted signals on line 136. Line 136 is coupled to the demodulator 138. The demodulator 138 is operative in conventional fashion to demodulate the signals applied thereto and to generate a demodulated signal on the line 142 which is coupled to an equalizer 144.

The equalizer 144 is operative to equalize the signal applied thereto and to generate an equalized signal on the line 146 which is coupled to a bit error detector 148.

The bit error detector is also coupled to receive the demodulated signal generated by the demodulator on line 142. The bit error detector is operative to detect bit error in the received signal by comparing the inputs and outputs of the equalizer 144. Signals representative of the number of bit errors detected by the bit error detector 148 is generated on the line 152.

The line 146 upon which the equalized signal generated by the equalizer 144 is generated is also coupled to a decoder 154. The decoder 154 decodes the signal received thereat and generates a decoded signal on line 156 which is provided to, for example, the PSTN.

A control device 162 is coupled to the line 152 and also to the line 146 to receive both indications of the bit errors detected by the bit error detector 148 and also to receive the equalized signal generated by the equalizer 144. The control device is further coupled to the line 142 to receive the signal generated by the demodulator on line 142.

The control device is operative at least to determine the propagation characteristics of the communication channel upon which the signals are transmitted to the base station.

In one cellular communication system, for instance, an uplink signal generated by the mobile unit is synchronized to a previously-transmitted down link signal. For instance, in the Group Special Mobile (GSM) cellular communication system, a timing advance (TA) value transmitted during operation of the GSM system can be utilized as representative of the distance separating the mobile unit and the base station. The retardation due to the speed of light of an uplink, or downlink, signal transmitted between the mobile unit and base station is utilized to provide the indication of the distance separating the mobile unit and the base station. Responsive to the determined distance, the antenna pattern of the antenna formed of the antenna elements 128 can be selected.

The antenna pattern of the antenna formed of the antenna elements 128 can further be selected as a function of the energy level of the uplink signal received at the base station of angular energy spreading of the received signal. The signal strength allowed of a signal varies as a function of distance and the propagation characteristics of the radio frequency channel. If the power level at which the uplink signal transmitted by the mobile unit is known, the signal strength of the signal received at the base station can be interpreted as a measure of the propagation characteristics of the radio frequency communication channel upon which the signal is transmitted. A strong signal or a signal exhibiting little energy spreading is indicative of a good line-of-sight condition in which a directional, antenna pattern would be advantageous. Weaker signal strengths or greater levels of energy dispersion are indicative that a broader antenna pattern would be preferable. The signal strength of the received signal can again be determined by the control device 162 wherein the control device 162 is operative to form a received signal strength detector.

The antenna pattern of the antenna formed of the antenna elements 128 can further be made to be a function of the detected distortion of the signal received by the base station as measured by the channel equalizer 144. Similarly, the antenna beam configuration can further be made to be a function of the number of bit errors detected by the bit error detector 148.

In a further embodiment of the present invention, the antenna pattern of the antenna formed of the antenna elements 128 is made to be a function of a combination of the distance separating the mobile unit and the base station, the angular energy spreading of the received signal, the signal strength of the received signal, and/or the number of bit errors indicative of the signal quality of the decoded signal.

The control device 162 generates signals on line 166 which are applied to the beam former 130. The beam former 130 is formed of a single element or a distributed element at each of the antenna elements 128. The device 130 switches on or switches off selected ones of the antenna elements 128 or alters the phase and/or amplitudes of the signals applied to the antenna elements 128, thereby to cause the antenna pattern to be of desired characteristics.

The base station further includes transmitter circuitry for transmitting down link signals to a mobile unit and is here shown to include an up converter 168 for up converting signals applied thereto, such as from a PSTN, in frequency and a modulator 172 to modulate the up-converted signals. The modulated signals modulated by the modulator 172 are applied to the antenna formed of the antenna elements 128 to cause transmission of the modulated signals to the remotely-positioned mobile unit.

Although the uplink signals are not necessarily transmitted upon the same radio frequency channel, selection of the antenna pattern when the base station transmits a downlink signal to a mobile unit can be made to be a function of the antenna pattern selected according to the techniques disclosed above. Generally, when the antenna selected when receiving an uplink signal is highly directional, the antenna pattern for best transmitting a downlink signal is typically also highly directional. Conversely, an antenna pattern selected to receive a broadly distributed uplink signal, i.e., an uplink signal upon which significant levels of multipath distortion is evident, does not provide an indication of an accurate direction of a directional antenna pattern for transmitting thereafter a downlink signal to the mobile unit.

Because the antenna beam configuration is adaptively alterable responsive to measurements of the propagation characteristics of the communication channel extending between the mobile unit and the base station, the antenna beam configuration can be altered during successive time slots of a single frame in a time division multiple access (TDMA) system to configure the antenna pattern best to transmit and to receive signals transmitted during successive communications with a plurality of mobile units.

More generally, an embodiment of the present invention permits an antenna pattern of an antenna to be adaptively altered, thereby to increase the performance of a phased-array, or other, antenna system. The need to compromise between a non-directional antenna pattern and a highly-directional antenna pattern is obviated as the antenna pattern can be adaptively altered. In the exemplary embodiment in which a base station of a cellular communication system includes apparatus for adaptively altering the geometry of an antenna pattern of an antenna, the communications towards a mobile of interest are advantageously optimized relative to noise and interference sources on the signal received at the base station, while minimizing the interference to the remainder of the network from the signals transmitted from the base station.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

What is claimed:

1. In a radio communication system having a first communication station and at least a second communication station, an improvement of an apparatus coupled to the first communication station for facilitating transmission of communication signals upon a radio communication channel between the first communication station and the second communication station, said apparatus comprising:

a propagation characteristic determiner for determining propagation characteristics of the radio communication channel upon which the communication signals are transmitted between the first communication station and the second communication station; and an antenna assembly coupled to receive indications of the propagation characteristics determined by said propagation characteristic determiner, said antenna assembly forming an antenna beam pattern at least alternately exhibiting at least a first lobe geometry and a second lobe geometry, selection of the antenna beam pattern exhibited by said antenna assembly determined by said propagation characteristic determiner.

2. The apparatus of claim 1 wherein said propagation characteristic determiner determines propagation delays of the communication signals transmitted upon the radio communication channel between the first and second communication stations, respectively.

3. The apparatus of claim 2 wherein a communication signal transmitted by the second communication station to the first communication station defines an uplink signal, wherein a communication signal transmitted by the first communication station to the second communication station defines a downlink signal, and wherein the propagation delays determined by said propagation characteristic determiner is determined by determining an indication of a time period between transmission of a selected downlink signal by the first communication station and reception of a selected uplink signal responsive thereto at the first communication station.

4. The apparatus of claim 1 wherein said propagation characteristic determiner determines a value representative of angular energy spreading of the communication signals transmitted upon the radio communication channel between the first and second communication stations, respectively.

5. The apparatus of claim 4 wherein a communication signal transmitted by the second communication station to the first communication station defines an uplink signal and wherein the value determined by said propagation characteristic determiner is representative of the angular energy spreading of the uplink signal.

6. The apparatus of claim 1 wherein said propagation characteristic determiner determines a value representative of signal quality of the communication signals transmitted upon the radio communication channel between the first and second communication stations, respectively.

7. The apparatus of claim 6 wherein a communication signal transmitted by the second communication station to the first communication station defines an uplink signal and wherein the value determined by said propagation characteristic determiner is representative of the signal quality of the uplink signal.

8. The apparatus of claim 1 wherein said propagation characteristic determiner determines a value representative of signal strength of the communication signals transmitted upon the radio communication channel between the first and second communication stations, respectively.

9. The apparatus of claim 8 wherein a communication signal transmitted by the second communication station to the first communication station defines an uplink signal and wherein the value determined by said propagation characteristic determiner is representative of the signal strength of the uplink signal.

10. The apparatus of claim 1 wherein the lobe geometry exhibited by said antenna assembly is adaptively selectable responsive to the propagation characteristics.

11. The apparatus of claim 1 wherein the antenna beam pattern exhibited by said antenna assembly comprises a plurality of lobe geometries, each lobe geometry defining a primary lobe of the antenna beam pattern, configuration of the primary lobe adaptively selectable responsive to the propagation characteristics determined by said propagation characteristic determiner.

12. The apparatus of claim 11 wherein the lobe geometry of the primary lobe is adaptively selectable to form at least either an elongated primary lobe or a non-elongated primary lobe.

13. The apparatus of claim 12 wherein the lobe geometry of the primary lobe is adaptively selectable further to form a selected primary lobe of a shape between the elongated primary lobe and the non-elongated primary lobe.

14. The apparatus of claim 1 wherein the first communication station forms a radio base station, wherein the second communication station forms a moveably-positionable transceiver, and wherein said propagation characteristic determiner is coupled to the radio base station to form a portion thereof.

15. The apparatus of claim 14 wherein said antenna assembly is coupled to the radio base station.

16. The apparatus of claim 1 wherein said antenna assembly comprises an antenna array formed of a plurality of antenna elements, the plurality of antenna elements having elemental characteristics which together define the antenna beam pattern exhibited said antenna assembly.

17. The apparatus of claim 15 wherein the antenna bean pattern exhibited by said antenna array is formed by super-positioning of fields of each antenna element of the antenna array.

18. The apparatus of claim 16 wherein the antenna beam pattern exhibit said antenna array is adaptively altered by adaptively altering numbers of the antenna elements which form the antenna array.

19. The apparatus of claim 18 wherein the antenna beam pattern exhibited by said antenna array is adaptively altered by altering phases of signals applied to selected ones of the antenna elements of the antenna array.

20. The apparatus of claim 18 wherein the antenna beam pattern exhibited by said antenna array is adaptively altered by altering amplitudes of signals applied to selected ones of the antenna elements of the antenna array.

21. The apparatus of claim 1 wherein the radio communication channel comprises an uplink channel and a downlink channel and wherein said propagation characteristic determiner determines the propagation chacteristics of the uplink channel.

22. In a method for communicating in a radio communication system having a first communication station and at least a second communication station and a radio communication channel upon which radio communication signals are transmitted between the first and second communication stations, respectively, an improvement of a method for at least receiving communication signals generated by the second communication station, said method comprising the steps of:

determining propagation characteristics of a communication signal transmitted between the first communication station and the second communication station upon the radio communication channel; and adaptively selecting an antenna beam pattern to be exhibited by an antenna assembly responsive to the propagation characteristics determined during said step of determining, the antenna beam pattern selected to be at least alternately of a first lobe geometry and of a second lobe geometry.

23. A radio base station for transmitting downlink signals to, and receiving uplink signals from, at least one subscriber unit, said radio base station comprising:

transceiver circuitry for generating the downlink signals and for processing the uplink signals;

a propagation characteristic determiner operative responsive to selected uplink signals processed by said transceiver circuitry, said propagation characteristic determiner for determining a value representative of the propagation characteristics of a radio communication channel upon which a communication signal is transmitted between the subscriber unit and the transceiver circuitry; and an antenna assembly coupled to said transceiver circuitry, said antenna assembly exhibiting an antenna beam pattern at least alternately exhibiting at least a first lobe geometry and a second lobe geometry, selection of the antenna beam pattern exhibited by said antenna assembly responsive to the value determined by said propagation characteristic determiner.

* * * * *

UNITED STATES PATENT AND TRADEMARK OFFICE
CERTIFICATE OF CORRECTION

PATENT NO. : 5,680,142
DATED : Oct. 21, 1997
INVENTOR(S) : Smith et al.

It is certified that error appears in the above-identified patent and that said Letters Patent is hereby corrected as shown below:

Column 14, line 14    Replace "chacteristics"
                      With --characteristics--

Signed and Sealed this

Twenty-fourth Day of March, 1998

Attest:

BRUCE LEHMAN

Attesting Officer    Commissioner of Patents and Trademarks